United States Patent
O'Connor et al.

(10) Patent No.: US 10,068,322 B2
(45) Date of Patent: Sep. 4, 2018

(54) INSPECTION SYSTEM

(71) Applicant: Analogic Corporation, Peabody, MA (US)

(72) Inventors: John P. O'Connor, Andover, MA (US); Charles Shaughnessy, Wenham, MA (US); Eric Zanin, Lexington, MA (US); Nicholas A. Accomando, Hingham, MA (US)

(73) Assignee: ANALOGIC CORPORATION, Peabody, MA (US)

( * ) Notice: Subject to any disclaimer, the term of this patent is extended or adjusted under 35 U.S.C. 154(b) by 0 days.

(21) Appl. No.: 15/107,216

(22) PCT Filed: Dec. 22, 2013

(86) PCT No.: PCT/US2013/077360
§ 371 (c)(1),
(2) Date: Jun. 22, 2016

(87) PCT Pub. No.: WO2015/094380
PCT Pub. Date: Jun. 25, 2015

(65) Prior Publication Data
US 2016/0335756 A1 Nov. 17, 2016

(51) Int. Cl.
*G06K 9/00* (2006.01)
*G06T 7/00* (2017.01)
(Continued)

(52) U.S. Cl.
CPC .......... *G06T 7/0004* (2013.01); *G06K 9/4671* (2013.01); *G06T 3/60* (2013.01);
(Continued)

(58) Field of Classification Search
CPC ....... G06K 9/4671; G06T 3/60; G06T 7/0004; G06T 7/0012; G06T 7/32;
(Continued)

(56) References Cited

U.S. PATENT DOCUMENTS

| | | | | |
|---|---|---|---|---|
| 9,073,138 B2 * | 7/2015 | Wills | ................... | B23K 9/0956 |
| 9,654,704 B2 * | 5/2017 | Holliday | ............ | H04N 5/23229 |

(Continued)

FOREIGN PATENT DOCUMENTS

| | | |
|---|---|---|
| JP | H07327935 A | 12/1995 |
| JP | 2004340632 A | 12/2004 |

(Continued)

OTHER PUBLICATIONS

International Search Report cited in related application No. PCT/US13/77360 dated Sep. 19, 2014, pp. 14.

(Continued)

*Primary Examiner* — Mekonen Bekele
(74) *Attorney, Agent, or Firm* — Cooper Legal Group, LLC (57) ABSTRACT

One or more techniques and/or systems are described for inspecting an object, such as a tire. The system comprises a radiation imaging system configured to examine the object via radiation to generate a radiation image depicting an interior aspect of the object and a machine vision system configured to measure visible light and/or infrared wavelengths to generate a vision image depicting an exterior aspect of the object. The radiation image and the vision image may be correlated to facilitate an inspection of the object which includes an inspection of the exterior aspect as well as the interior aspect.

20 Claims, 8 Drawing Sheets

(51) Int. Cl.
*G06K 9/46* (2006.01)
*G06T 3/60* (2006.01)
*G06T 7/32* (2017.01)

(52) U.S. Cl.
CPC .............. *G06T 7/0012* (2013.01); *G06T 7/32* (2017.01); *G06T 2207/10048* (2013.01); *G06T 2207/10072* (2013.01); *G06T 2207/20221* (2013.01); *G06T 2207/30252* (2013.01)

(58) Field of Classification Search
CPC . G06T 2207/10048; G06T 2207/10072; G06T 2207/20221; G06T 2207/30252
See application file for complete search history.

(56) References Cited

U.S. PATENT DOCUMENTS

| | | | |
|---|---|---|---|
| 2003/0181809 A1* | 9/2003 | Hall | A61B 6/12 600/425 |
| 2005/0128291 A1* | 6/2005 | Murakami | H04N 7/181 348/143 |
| 2006/0043296 A1* | 3/2006 | Mian | G01J 1/42 250/330 |
| 2007/0075050 A1* | 4/2007 | Heyl | B23K 26/03 219/121.6 |
| 2009/0149977 A1 | 6/2009 | Schendel | |
| 2010/0045809 A1* | 2/2010 | Packard | H04N 5/2258 348/222.1 |
| 2010/0284601 A1* | 11/2010 | Rubner | A61B 6/4405 382/132 |
| 2014/0346359 A1* | 11/2014 | Holliday | H04N 5/23229 250/340 |
| 2015/0036023 A1* | 2/2015 | Gilbert | H04N 5/2256 348/234 |

FOREIGN PATENT DOCUMENTS

| | | | |
|---|---|---|---|
| WO | 20100067281 A1 | 6/2010 | |
| WO | WO 2013007479 A1 * | 1/2013 | ............ G01B 11/22 |

OTHER PUBLICATIONS

First Chinese Office Action cited in Chinese Application No. 201380081820.3 dated Feb. 5, 2018, 10 pgs.

* cited by examiner

INSPECTION SYSTEM

BACKGROUND

The present application relates to the field of imaging, and in particular to an inspection system configured to image an exterior aspect and an interior aspect of an object. It finds particular application with industrial applications where the inspection system is configured to image the object for defects. However, it may also relate to other applications, such as medical applications and/or security applications, where it may be desirable to generate images depicting both exterior aspects and interior aspects of an object for threat detection, medical diagnosis, and/or medical treatment, for example.

Computed tomography (CT) systems and other radiation imaging systems (e.g., single-photon emission computed tomography (SPECT), digital radiography, line-scan systems, etc.) are useful to provide information (e.g., images) regarding interior aspects of an object under examination. The object is exposed to radiation photons (e.g., x-ray photons, gamma ray photons, etc.) from a radiation source, and radiation photons traversing the object are detected by a detector array positioned substantially diametrically opposite the radiation source relative to the object. A degree to which the radiation photons are attenuated (e.g., absorbed, scattered, etc.) by the object, or rather by aspects of the object that intersect a beam-path of the radiation, is measured to determine information about such aspects. For example, in CT systems, the degree to which radiation photons are attenuated may be used to determine the density and/or atomic number of such aspects. Highly dense aspects of an object typically attenuate more radiation than less dense aspects, thus allowing cracks, defects, and/or other features to be identified from the collected information and/or from images generated therefrom that depict an interval view of the object.

While such systems have proven useful for identifying features of interior aspects of the object and/or for generating an internal view of the object, radiation imaging systems typically do not provide information about exterior aspects of the object, such as information about an exterior surface of the object.

SUMMARY

Aspects of the present application address the above matters, and others. According to one aspect, an inspection system is provided. The inspection system comprises a machine vision system configured to examine an exterior surface of an object to generate a vision image depicting zero or more defects on the exterior surface and a radiation imaging system configured to examine an interior volume of the object to generate a radiation image depicting zero or more defects within the interior volume. The inspection system also comprises a correlation component configured to spatially correlate a first region of the vision image with a second region of the radiation image.

According to another aspect, a method for object inspection is provided. The method comprises examining an exterior surface of an object to generate a first image depicting zero or more defects on the exterior surface by measuring wavelengths in at least one of a visible light spectrum or an infrared spectrum. The method also comprises examining an interior volume of the object to generate a second image depicting zero or more defects within the interior volume using at least one of x-rays or gamma-rays. The method further comprises fusing a first region of the first image with a second region of the second image to generate a fused image and analyzing the fused image to detect a defect of the object.

According to another aspect, an inspection system is provided. The inspection system comprises a machine vision system configured to examine an exterior surface of an object to generate a vision image depicting zero or more defects on the exterior surface. The inspection system also comprises a radiation imaging system configured to examine an interior volume of the object to generate a radiation image depicting zero or more defects within the interior volume, the radiation imaging system comprising a radiation source and a detector array configured to rotate about a first axis. The inspection system also comprises an object movement component configured to rotate the object about a second axis concurrently with at least one of the machine vision system examining the exterior surface and the radiation imaging system examining the interior volume, the second axis substantially perpendicular to the first axis. The inspection system further comprises a correlation component configured to spatially correlate a first region of the first image with a second region of the second image.

FIGURES

The application is illustrated by way of example and not limitation in the figures of the accompanying drawings, in which like references indicate similar elements and in which.

DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Among other things, systems and/or techniques are described herein for acquiring information regarding interior aspects (e.g., such as an interior volume) and exterior aspects (e.g., such as an exterior surface) of an object under examination. In some embodiments, such information may include three-dimensional images depicting a cross-sectional slice of the object that depicts both an exterior surface of the object as well as interior aspects of the object. In this way, the object, such as a tire, can be inspected to identify defects that may begin at the surface of the tire and continue radially inward toward a center axis of the tire, for example.

According to some embodiments, a system is provided that comprises a radiation imaging system, such as a computed tomography (CT) system, and a machine vision system, such as an infrared imaging system and/or a visible-light imaging system. The radiation imaging system is configured to examine the object to generate information regarding an interior aspect(s) of the object (e.g., an aspect of the object typically concealed from human view without opening/dissecting or otherwise penetrating the object) while the machine vision system is configured to examine the object to generate information regarding an exterior aspect(s) of the object (e.g., an aspect of the object typically visible by a human). For example, the radiation imaging systems may be configured to generate information about an interior composition of a tire wall and the machine vision system may be configured to generate information about an exterior surface of the tire wall.

According to some embodiments, the radiation imaging system and/or the machine vision system are configured to generate two-dimensional and/or three-dimensional images of the object. For example, the radiation imaging system may be configured to generate three-dimensional radiation images while the machine vision system generates two-dimensional vision images and/or three-dimensional vision images depicting the exterior surface of the object. In some embodiments, geographical markers are identified within the radiation images and/or within the vision images. In some embodiments, such geographical markers may facilitate the fusion of the images generated by the two imaging modalities.

In some embodiments, the radiation images, the vision images, and/or the fused images generated by the fusion of the radiation images and the vision images may be processed by a feature identification component or other analysis component (e.g., threat detection component) configured to analyze the image to identify specified features. For example, the feature identification component may analyze the fused images to determine whether the object comprises any cracks that begin at the surface and extend at least one inch into the wall of a tire. If such defects are identified, the feature identification component may issue an alert and/or divert the object to a particular location (e.g., a reject location). In this way, objects having such features may be distinguished from objects that do not have such features, for example.

Figure 1:
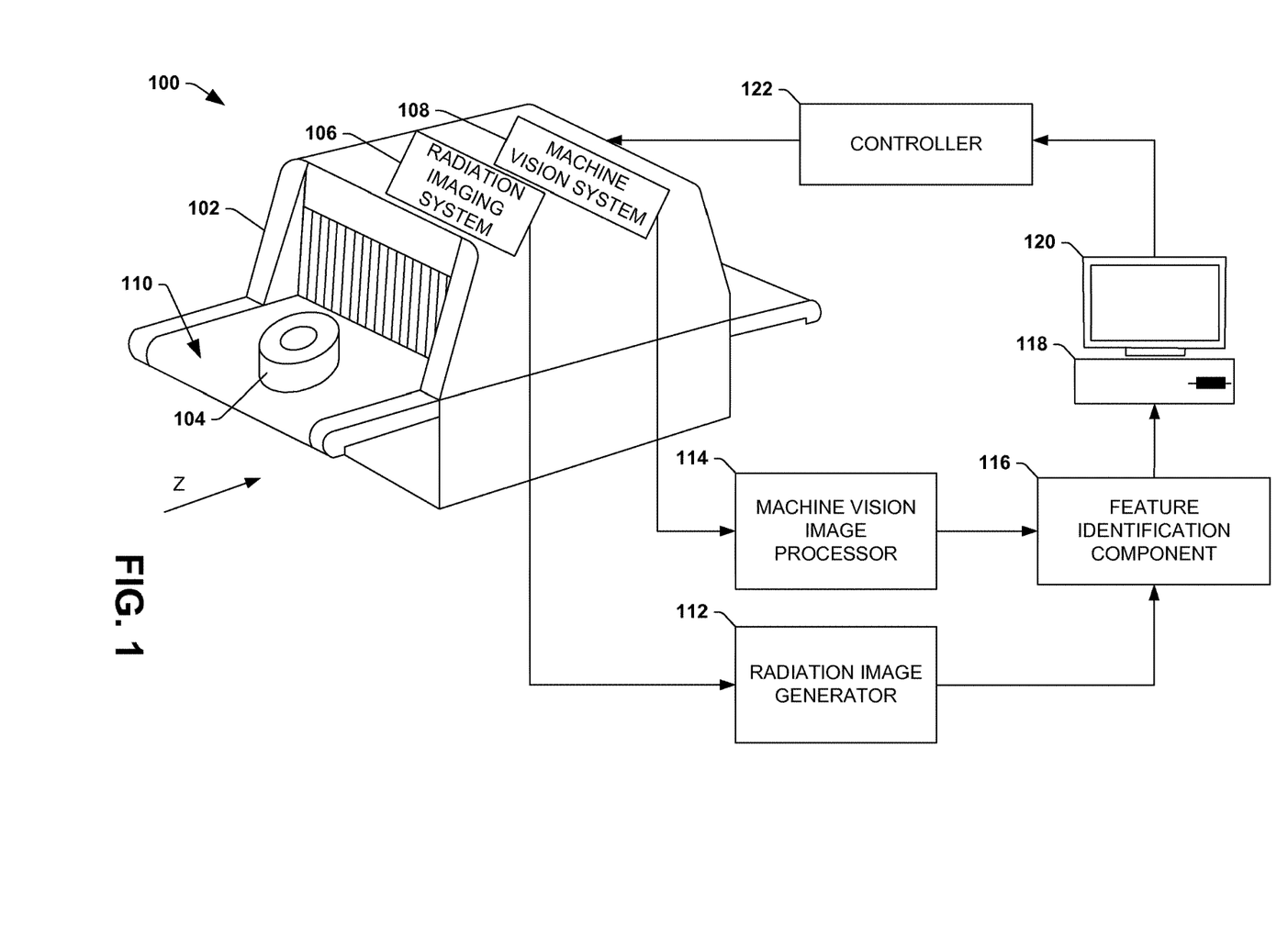
FIG. 1 illustrates an example system.

Referring to FIG. 1, an example system 100, such as an inspection system, according to some embodiments is provided. The system 100 comprises an examination unit 102 configured to examine one or more objects 104, such as tires, baggage, lumber, etc., and one or more processing components configured to process signals and/or data yielded from an examination of the object 104 by the examination unit 102. By way of example, such processing components may include, among other things, a radiation image generator 112, a machine vision image processor 114, and/or a feature identification component 116.

The examination unit 102 comprises a radiation imaging system 106, a machine vision system 108, and an object movement system 110 configured to support the object within the examination unit 102 and/or to move the object relative to at least one of the radiation imaging system 106 or the machine vision system 108. For example, the object movement system 110 may comprise a conveyor belt assembly and/or other assembly (e.g., roller assembly) configured to translate the object through an examination region of the radiation imaging system 106 and/or the machine vision system 108 (e.g., translating the object in the z-direction).

Figure 2:
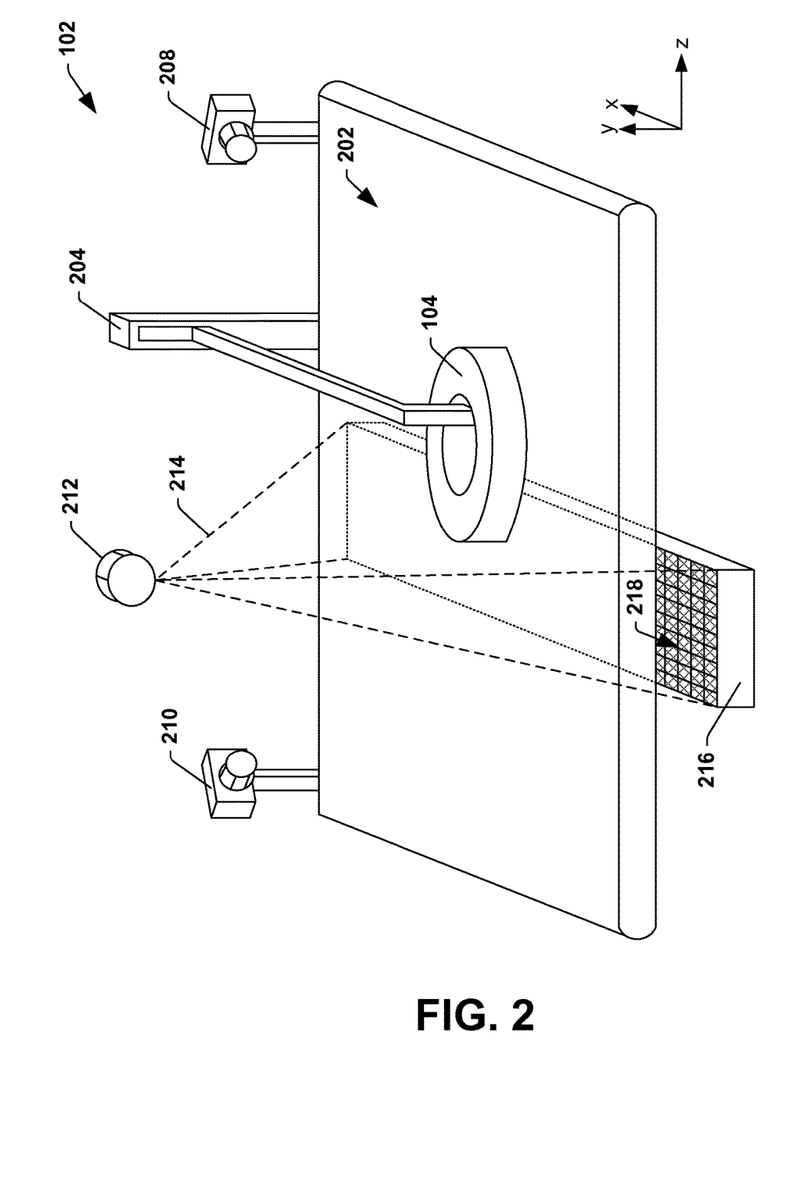
FIG. 2 illustrates a perspective view of an example examination unit.

As will be further described with respect to FIG. 2, the radiation imaging system 106 comprises a radiation source and a detector array. The arrangement and/or features of the radiation source and/or detector array may be a function of the type of radiation imaging system 106 included in the system. Example types of such radiation imaging systems 106 include, among other things, a CT system (e.g., where the position of the radiation source and the detector array remain substantially fixed relative to one another but are varied relative to the object), a line-scan system, a tomosynthesis system (e.g., where the position of the radiation source is varied relative to the detector array), and/or a digital projection system.

The radiation source, which may be an x-ray source, gamma-ray source, or other ionizing radiation source, is typically positioned substantially diametrically opposite the detector array relative to the object 104 being examined. During an examination of the object 104 by the radiation imaging system 106, the radiation source is configured to expose the object 104 to radiation photons, at least some of which traverse the object 104 and are detected by the detector array. The energy spectrum or spectra of such radiation photons may depend upon the application, the detector sensitivity, and/or the type(s) of objects 104 to be examined.

The detector array is configured to directly or indirectly convert the detected radiation photons into signals that carry information about the radiation photons. The content of the information may be a function of, among other things, the type of detector array within the radiation imaging system 106. By way of example, where the detector array is a charge-integrating detector array, the information may be indicative of the number of radiation photons detected over a measurement period (e.g., such a measurement period may correspond to a view in some applications). As another example, where the detector array is a photon counting detector array, the information may be indicative of a detection location and a detection time for respective detected radiation photons.

The content of information may also be a function of, among other things, the type of radiation imaging system. By way of example, where the radiation imaging system is a multi-energy radiation system (e.g., a dual-energy radiation system configured to emit radiation at two distinct energies or two distinct energy spectrums), the information may be indicative of the energy of detected radiation photons. Where the radiation imaging system is configured as a single-energy radiation system, the information may comprise little to no content about the energy of detected radiation photons.

The information generated by the detector array of the radiation imaging system 106 may be output to a radiation image generator 112 configured to process the information using suitable image generation techniques such as analytical, iterative, and/or other image generation techniques to generate one or more radiation images. By way of example, such image generation techniques may comprise tomosynthesis reconstruction techniques, back-projection techniques, and/or iterative reconstruction techniques that convert the information from projection space to image space. The radiation images may comprise two-dimensional and/or three-dimensional representations of the object 104.

The machine vision system 108 comprises one or more image sensors configured to measure wavelengths in the visible light spectrum and/or infrared spectrum to generate information regarding an exterior aspect of the object 104, such as a surface of the object 104 that is visible without destructing (e.g., dissecting) the object 104. In some embodiments, the image sensors are arranged to form a stereo camera configured to view the object from two or more distinct viewpoints. In other embodiments, the image sensors are arranged to form a non-stereo camera configured to view the object from merely a single viewpoint.

The information generated by the machine vision system 108 may be output to a machine vision image processor 114 configured to process the information generated by the machine vision system 108. Such processing may comprise compiling the information to generate two-dimensional and/or three-dimensional images of the object 104, filtering the images based upon specified filtering parameters, and/or otherwise preparing the vision images for further processing by a feature identification component 116 and/or for display to a user. As still another example, a vision image generated by the machine vision system 108 may represent a nonplanar surface of the object that has been compressed into a dimensional image and the machine vision image processor 114 may be configured to dewarp the image (e.g., to remove distortion in the image caused by the non-planar surface).

The feature identification component 116 is configured to analyze the radiation image(s) generated by the radiation image generator 112 and/or the vision image(s) generated by the machine vision image processor 114 to identify specified features. For example, the feature identification component 116 may analyze a property, such an intensity of the radiation images and/or a hue of vision images to identify specified defects within the object using analytic, iterative, or other feature identification techniques.

In some embodiments, one or more radiation images may be geometrically correlated and/or fused with one or more vision images prior to performing an analysis to identify specified features. By way of example, the feature identification component 116 may be configured to identify geographical markers, such as treads, company emblems, and/or other signatures that would be visible in both radiation images and vision images. Using such geographical markers, the feature identification component 116 may geometrically align the radiation image(s) with the vision image(s) to geometrically correlate such images and/or to fuse such images to generate a fused image depicting both the interior aspect (e.g., represented in the radiation image) and the exterior aspect (e.g., represented in the vision image). Where a fused image is generated, the feature identification component 116 may analyze the fused image to identify the specified features instead of or in addition to analyzing the radiation images and/or vision images. Further, where the images are geometrically correlated, but not fused, the analysis of the radiation images and/or vision images to identify features may occur after the geometric correlation.

It is to be appreciated that while particular reference is made herein to the feature identification component identifying defects within the object using one or more images, other features may also or instead be identified by the feature identification component 116. For example, in security applications, the feature identification component 116 may be configured to detect potential threat items concealed within an object. As another example, in a lumber application, the feature identification component 116 may be configured to identify knots having specified characteristics (e.g., knots of a specified size and/or depth in the lumber). Accordingly, any number of a variety features are contemplated herein.

A terminal 118, or workstation (e.g., a computer), is configured to receive the radiation images, vision images, fused images, and/or results of the analysis by the feature identification component 116, which can be displayed on a monitor 120 to a user (e.g., machine operator, security personnel, etc.). In this way, the user can inspect the image(s) to confirm the analysis by the feature identification component 116 and/or perform a visual inspection of at least some of the images. The terminal 118 can also be configured to receive user input which can direct operations of the examination unit 102.

In the example environment 100, a controller 122 is operably coupled to the terminal 118. The controller 122 may be configured to control operations of the examination unit 102 based upon instructions received from the terminal 118. By way of example, a user may wish to re-examine an object and may request that the object movement system 110 reverse a translation direction of the object 104 (e.g., bring the object back into the examination region). As another example, the user may select a particular region of interest within an image and the controller 122 may adjust one or more properties of the radiation imaging system 106 and/or machine vision system 108 based upon the region of interest (e.g., adjusting a voltage applied to the radiation source, adjusting a sensitivity or exposure of the image sensor, etc.). By way of example, the feature identification component 116 may identify a potential defect within the object 104 and the terminal 118 may issues instructions to the controller 122 which instruct the controller 122 to rescan a region of the object 104 comprising the potential defect. Further, the controller 122 may adjust one or more properties of the radiation imaging system 106 and/or machine vision system 108 based upon the region (e.g., to generate images which are optimized to (e.g., focused at) the region).

FIG. 2 illustrates a perspective view of an examination unit 102 wherein a housing is removed to show an interior portion of the examination unit 102 according to some embodiments. The examination unit 102 comprises a radiation imaging system 106, a machine vision system 108, and an object movement system 110, as illustrated in FIG. 1.

The object movement system 110 comprises one or more apparatuses configured to move the object 104 relative to the radiation imaging system 106 and/or the machine vision system 108. For example, in the illustrated embodiment, the object movement system 110 comprises a conveyor belt assembly 202 configured to translate the object 104 into and/or out of the examination unit 102 and an articulating arm assembly 204 configured to translate the object 104 through the examination region. By way of example, the object 104 may be received at an entrance to the examination unit 102 via the conveyor belt assembly 202 and may be conveyed into the examination unit 102 via the conveyor belt assembly 202. Once inside the examination unit 102, the articulating arm assembly 204 may be configured to make contact with the object 104 and translate the object 104 through the examination region wherein the object 104 is examined by the radiation imaging system 106 and/or the machine vision system 108. In some embodiments, the object 104 is translated along an axis extending in the z-direction by the conveyor belt assembly 202 and/or the articulating arm assembly 204.

In some embodiments, the articulating arm assembly 204 is configured to adjust a relative position between the object 104 and the conveyor belt assembly 202 for purposes of the examination by the radiation imaging system 106 and/or the machine vision system 108. By way of example, in some embodiments, the articulating arm assembly 204 is configured to elevate the object 104 relative to the conveyor belt assembly 202 (e.g., causing an underside of the object 104 that is usually in contact with the conveyor belt assembly 202 to not make contact with the conveyor belt assembly 202). Thus, the articulating arm assembly 204 lifts that object 104 from the conveyor belt assembly 202 for at least a portion of the examination.

In some embodiments, the articulating arm assembly 204 is further configured to rotate the object 104 about an axis substantially perpendicular to a plane of the conveyor belt assembly 202 upon which the object 104, at times, rests. For example, in the illustrated embodiment, the articulating arm assembly 204 may rotate the object 104 about an axis extending in the y-direction. In this way, a first image sensor 208 of the machine vision system 108 can view multiple orientations of the object 104, for example (e.g., while the first image sensor 208 remains stationary).

The radiation imaging system 106 comprises a radiation source 212 configured to emit fan-shaped and/or cone-shaped radiation 214 in the direction of a detector array 216 to expose the detector array 216 (e.g., and thus objects 104 translated into an examination region between the radiation source 212 and the detector array 216) to the radiation 214. The detector array 216 comprises a plurality of detector cells 218 typically arranged in columns (e.g., where a column extends in the z-direction) and rows (e.g., where a row extends in the x-direction). The direction in which rows of detector cells extend is sometimes referred to as the fan-angle direction and the direction in which columns of detector cells extend is sometimes referred to as the cone-angle direction.

The detector array 216 may comprise as few as one row (e.g., such as commonly found in a line-scan system) to as many as 64 or more rows (e.g., such as commonly found in CT systems and/or digital projection systems). Moreover, the detector array 216 may have a substantially planar detection surface (e.g., such as commonly found in line-scan systems and/or digital projection systems)) and/or may have a substantially arcuate detection surface (e.g., such as commonly found in CT systems), for example.

In some embodiments, the radiation source 212 and the detector array 216 are configured to rotate relative to the conveyor belt assembly 202 about an axis of rotation (e.g., which may extend in the z-direction) while the relative position between the radiation source 212 and the detector array 216 is maintained. In this way, the radiation source 212 views the object from multiple x,y locations. In other embodiments, at least one of the radiation source 212 and/or the detector array 216 is configured to rotate relative to the conveyor belt assembly about the axis of rotation while at least one of the radiation source 212 and/or the detector array 216 remains substantially fixed relative to the conveyor belt assembly (e.g., causing a relative position between the radiation source 212 and the detector array 216 to vary). In still other embodiments, the radiation source 212 and the detector array 216 remain in substantially fixed positions relative to the conveyor belt assembly 202 during an examination of an object 104.

The machine vision system 108 comprises one or more images sensors 208, 210 configured to detect infrared and/or visible light wavelengths from which one or more images of the object 104 can be generated. For example, in the illustrated embodiment, the machine vision system 108 comprises two substantially fixed image sensors 208, 210 that are mounted on substantially diametrically opposite sides of the detector array 216. In other embodiments, at least some of the image sensors 208, 210 may be configured for movement relative to the conveyer belt assembly 202.

The image sensors 208, 210 may be configured to capture still images and/or video images of the object 104. Moreover, it is to be appreciated that by rotating the object 104 (e.g., about a y-axis) during an examination by the machine vision system 108, a single image sensor 208 may image multiple regions (e.g., sides) of the object 104 (e.g., facilitating the generation of a 3D vision image using merely one image sensor).

It is to be appreciated that the number of image sensors, type of image sensors, and/or the placement of such image sensors may depend upon the application and/or the features to be identified from vision images resulting from the examination by the image sensors. For example, the lighting within the examination unit may be such that infrared image sensors are better suited to an application than visible light sensors. As another example, the number of sensors, type of sensors, and/or whether at least some of such image sensors are configured for movement may depend upon whether the object movement system 110 is configured to rotate the object 104 about an axis. For example, fewer image sensors may be required to capture images of a surface of the object 104 if the object movement system 110 is configured to rotate the object than if the object movement system 110 is not configured to rotate the object.

Figure 3:
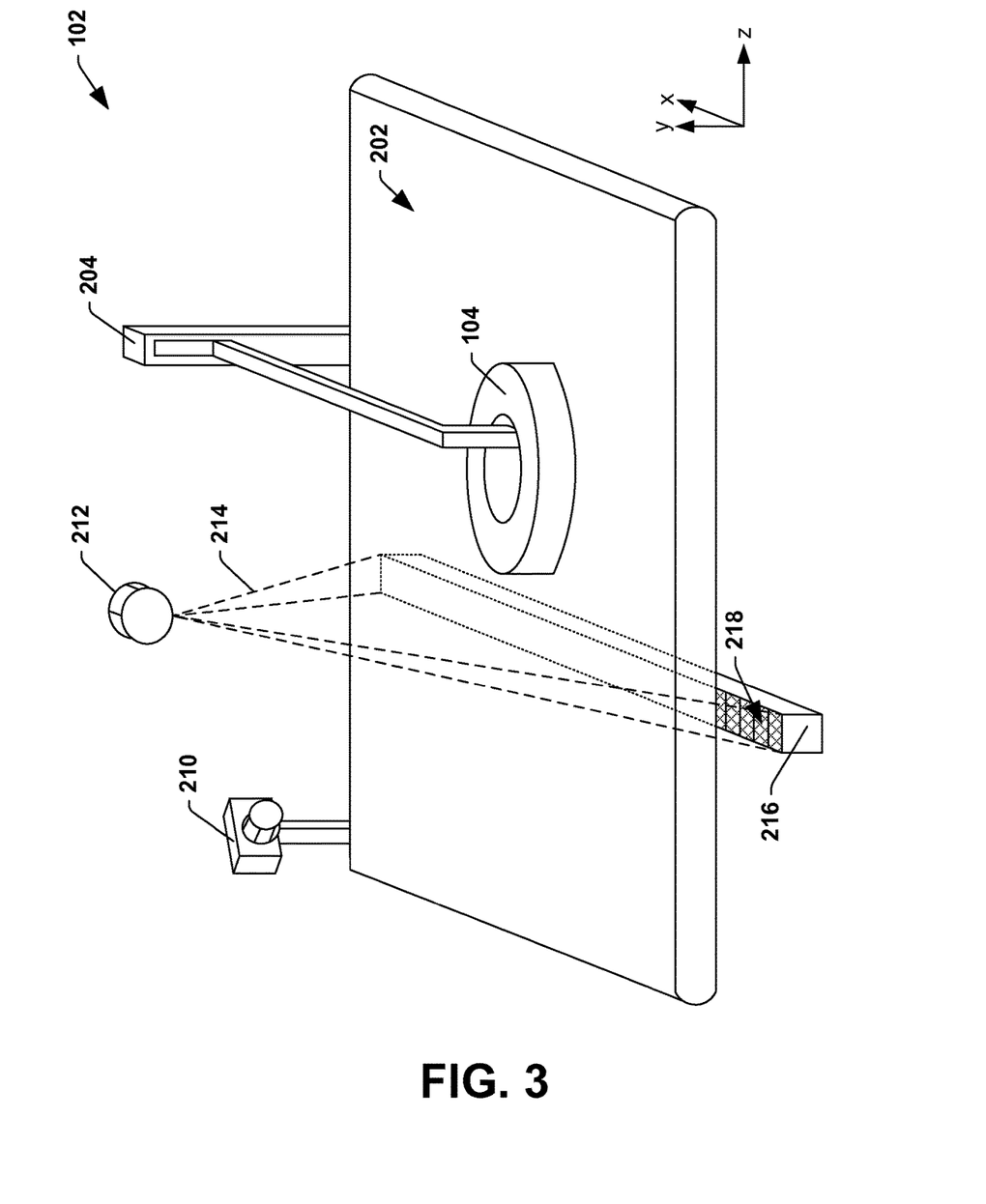
FIG. 3 illustrates a perspective view of an example examination unit.

FIG. 3 illustrates a perspective view of another examination unit 102 according to some embodiments. In this embodiment, the detector array 216 comprises a single row of detector cells 218 extending in the x-direction (e.g., extending in the fan-angle direction) and a plurality of columns of detector cells 218 (e.g., where respective columns merely comprise a single detector cell) extending in the z-direction (e.g., extending in the cone-angle direction). Moreover, due to the detector array 216 comprising a single row of detector cells 218, the radiation source 212 is configured to emit fan-beam radiation 214 (e.g., which has little to no outwardly expansion in the cone-angle direction).

In embodiments where the object 104 is translated in the z-direction while being rotated about an axis extending in the y-direction by the articulating arm assembly 204, for example, respective locations on the object 104 may be viewed from a plurality of angles to generate volumetric data indicative of the object (e.g., where, for a given location within the object, data corresponding to at least two rays having different trajectories and converging on the given location is available from which to reconstruct a volumetric image).

Further, the machine vision system 108 illustrated in FIG. 3 differs from the machine vision system illustrated in FIG. 2 in that it comprises merely a single image sensor 210 as opposed to the two image sensors 208, 210 illustrated in FIG. 2.

Figure 4:
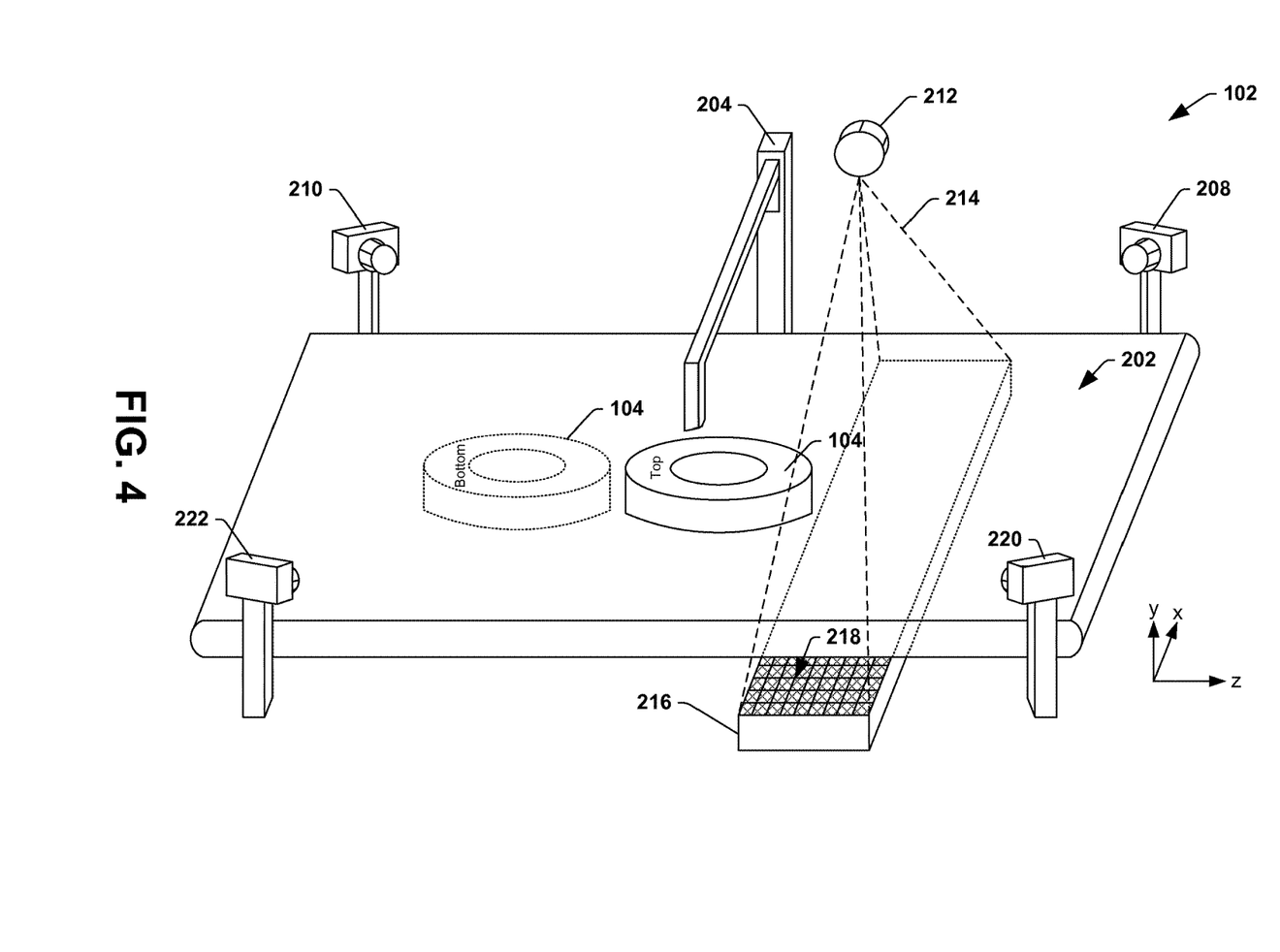
FIG. 4 illustrates a perspective view of an example examination unit.

Referring to FIG. 4, a perspective view of another examination unit 102 according to some embodiments is illustrated. In this example, the machine vision system 108 comprises four image sensors 208, 210, 220, and 222. A first set of image sensors 208, 220 is configured to examine the object 104 while the object is in a first orientation relative to the conveyor belt assembly 202 and a second set of image sensors 210, 222 is configured to examine the object 104 while the object 104 is in a second orientation relative to the conveyor belt assembly 202. By way of example, the first set of image sensors 208, 220 may be positioned near an entrance of the examination unit 102, for example, and may be configured to examine the object 104 while a first face of the object is facing upward (e.g., the top of the tire is facing upward). The second set of image sensors 210, 222 may be positioned near an exit of the examination unit 102, for example, and may be configured to examine the object 104 while a second face of the object is facing upward (e.g., the bottom of the tire is facing upward). In such an embodiment, the articulating arm assembly 204 may be configured to reposition the object 104 between the entrance and the exit (e.g., flipping the object on the conveyor belt assembly 202). By way of example, after the radiation imaging system 106 completes the examination of the object 104 via radiation, the articulating arm assembly 204 may contact the object 104 and flip the object (e.g., causing a portion of the object 104 concealed by the conveyor belt assembly 202 to be exposed for examination by the second set of image sensors 210, 222).

In some applications, such as one which uses a configuration similar to the configuration illustrated in FIG. 4, the articulating arm assembly 204 may not be configured to rotate the object 104 during at least a portion of the examination performed by the radiation imaging system 106 and/or at least a portion of the examination performed by the machine vision system 108, for example. Moreover, the object 104 may rest on the conveyor belt assembly 202 during at least a portion of the examination performed by the radiation imaging system 106 and/or at least a portion of the examination performed by the machine vision system 108.

Is it to be appreciated that the foregoing configurations of the examination unit 102 are merely intended to provide example configurations for an examination unit and are not intended to limit the scope of the instant disclosure. By way of example, in yet another embodiment, the radiation source 212 may be configured to translate on a track (e.g., extending in an x,y plane) while a position of the detector array 216 is substantially fixed, causing a relative position between the radiation source 212 and the detector array 216 to vary during the examination of the object 104.

Figure 5:
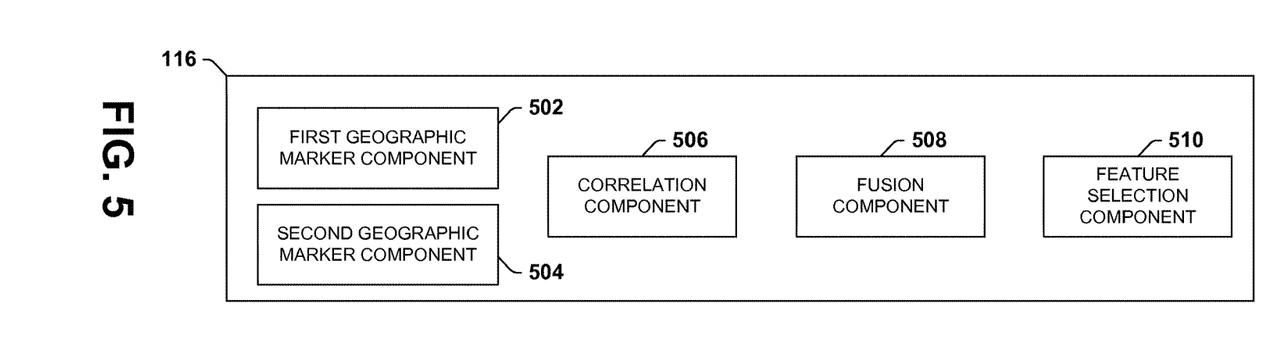
FIG. 5 is a component block diagram of an example feature identification component.

Referring to FIG. 5, a component block diagram of an example feature identification component 116 according to some embodiments is illustrated. It is to be appreciated that the components described herein are merely example components and that the components may differ based upon application and/or based upon design choices. By way of example, the feature identification component 116 illustrated by FIG. 5 comprises a fusion component 508 configured to fuse a radiation image(s) with a vision image(s). In other embodiments, it may be desirable to spatially correlate a radiation image(s) with a vision image(s) but not desirable to fuse such images to generate a fused image that depicts the interior aspect(s) and exterior aspect(s) of the object 104.

The feature identification component 116 comprises a first geographic marker component 502, a second geographic marker component 504, a correlation component 506, the fusion component 508, and a feature selection component 510. The first geographic marker component 502 is configured to identify unique points in vision image(s) which can be used to correlate the vision image(s) with radiation image(s). By way of example, the first geographic marker component 502 may use one or more characteristics (e.g., intensity, hue, etc.) of respective pixels of a vision image or a neighborhood of pixels to identify edges of the object and/or unique patterns within the object (e.g., such as company emblem). Respective locations within the vision image that correspond to such edges and/or patterns may then be associated with a geographical marker that indicates the location of the edge and/or pattern with respect to the vision image.

The second geographic marker component 504 is configured to perform a similar function with respect to radiation image(s). By way of example, the second geographic marker component 504 may use one or more characteristics (e.g., intensity, hue, etc.) of respective pixels of a radiation image or a neighborhood of pixels to identify edges of the object and/or unique patterns of the object (e.g., such as company emblem). Respective locations within the radiation image that correspond to such edges and/or patterns may then be associated with a geographical marker that indicates the location of the edge and/or pattern with respect to the radiation image.

By way of example, a tire may comprise a company emblem or other markings that extend from an exterior surface of the object into an interior volume of the object. Thus, the company emblem or other markings may be identifiable in a vision image(s) as well as a radiation image(s). Accordingly, the first geographic marker component 502 and the second geographic marker component 504 may be configured to identify the geographical locations of such a company emblem or other markings in the vision image(s) and in the radiation image(s).

The correlation component 506 is configured to spatially correlate the vision image(s) with the radiation image(s) (e.g., thus aligning the vision image(s) with the radiation image(s)) using the geographical markers generated by the first geographic marker component 502 and the second geographic marker component 504. For example, the correlation component may use the patterning (e.g., layout) of such markers in the vision images and/or in the radiation images to correlate such images.

It will be appreciated that while reference is made to correlating the vision image(s) with the radiation image(s) based upon identifiable markings in respective images, in other embodiments the correlation component 506 may be configured to correlate the vision image(s) with the radiation image(s) using other techniques. By way of example, the correlation component 506 may be configured to correlate the vision image(s) with the radiation image(s) based upon the speed at which the object is translated, the speed at which the object is rotated, the position(s) of the image sensor(s), the position(s) of the radiation source/detector array, and/or a rotational speed of the radiation source and/or detector array, for example. Accordingly, in such embodiments, the first geographic marker component 502 and/or the second geographic marker component 504 may provide redundancy (e.g., to verify the correlation) and/or may be unnecessary.

In some embodiments, the feature identification component 116 further comprises a fusion component 508 configured to fuse a vision image(s) with a radiation image(s) to generate a fused image using analytical, iterative, or other fusion techniques. The fused image depicts an exterior aspect of the object as well as an interior aspect of the object. By way of example, the fused image may depict an exterior surface of the object as well as an interior volume of the object.

It is to be appreciated that as used herein, fuse, fusion, and/or the like is intended to refer to the combining of images from two or more image modalities to generate an image which depicts contents of respective images. In some embodiments, fusion involves layering two or more images, where a top image is made at least partially transparent, causing images below the top image to be visible. In still other embodiments, fusion involves combining at least some pixels of a first image with at least some pixels of a second image to generate an image that comprises pixels having characteristics of both images.

The feature identification component 116 further comprises a feature selection component 510 configured to identify and/or select features of interest. In the illustrated embodiment, the feature selection component 510 is configured to identify and/or select features in fused images generated by the fusion component 508. However, in other embodiments, the feature selection component 510 may identify and/or select features in the vision image(s) and/or the radiation image(s).

In some embodiments, the feature selection component 510 is configured to begin the feature identification/selection process by performing connected component labeling (CCL) techniques and/or image segmentation techniques on the fused image (e.g., or the image to be processed to identify/select the features). Such techniques are configured to dissect the fused image into various parts, where respective parts may represent a different aspect of the object (e.g., a first part may represent a metal ribbon, a second part may represent a crevice, etc.). Next, the feature selection component 510 may label respective parts based upon shape characteristics, attenuation characteristics, density characteristics, z-effective characteristics, etc. Finally, the feature selection component 510 may compare respective parts to a standard for such parts. By way of example, the feature selection component 510 may compare a metal ribbon, as represented in the image(s), to a standard for metal ribbons. If one or more properties of the metal ribbon differ from the standard, the metal ribbon may be identified by the feature selection component 510 as comprising a defect.

In still other embodiments, the feature selection component 510 may analyze an image(s) to determine if a cluster of pixels of sufficient size have a particular set of characteristics. By way of example, the intensity of pixels representing a crevice may be less than the intensity of pixels not representing a crevice. An entity may specify the allowable size of crevices in the object. If a neighborhood of pixels has an intensity below a specified intensity, the feature selection component 510 may flag the object as comprising a crevice that is larger than allowable (e.g., thus labeling the object as comprising a defect).

Results generated by the feature selection component 510 may be output to a terminal 118 which alerts an entity to a positive feature identification and/or provides information regarding the positive feature identification to other components (e.g., such as a diversion component that diverts from a conveyor belt objects that comprise a sufficient number of defects and/or defects of a specified magnitude).

Figure 6:
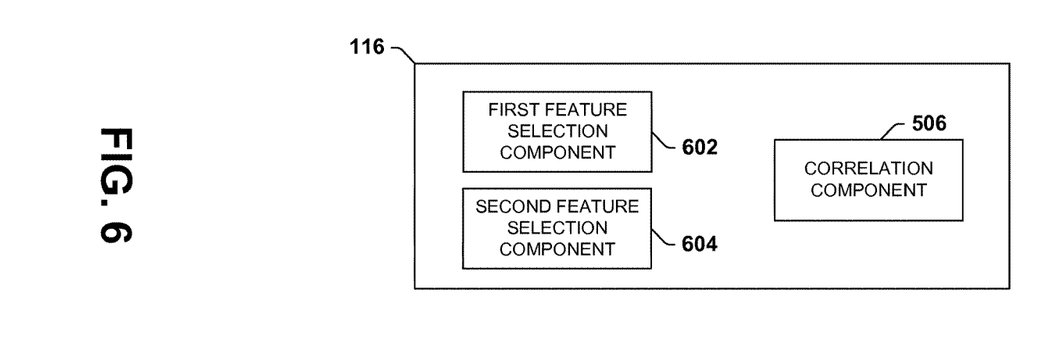
FIG. 6 is a component block diagram of an example feature identification component.

Referring to FIG. 6, another example of a feature identification component 116 is provided. In such an embodiment, the feature identification component 116 comprises a first feature selection component 602 configured to identify features based upon one or more vision images and a second feature identification component 604 configured to identify features based upon one or more radiation images. In embodiments where features are identified in vision images and radiation images separately, the correlation component 506 may be configured to correlate the images based upon the features. By way of example, the first feature selection component 602 may identify a crevice have a first two-dimensional shape and the second feature selection component 604 may identify a crevice having a similar two-dimensional shape. Accordingly, the correlation component 506 may use, among other things, the crevice to spatially correlate the vision image with the radiation image (e.g., such that the crevice is aligned in the two images).

In some embodiments, a third feature selection component (not shown) may be configured to further process the images after the correlation has been made. In this way, features that are continuous over the vision image and the radiation image can be identified and/or the scope of such features (e.g., the depth of a crevice) can be measured, for example.

Figure 7:
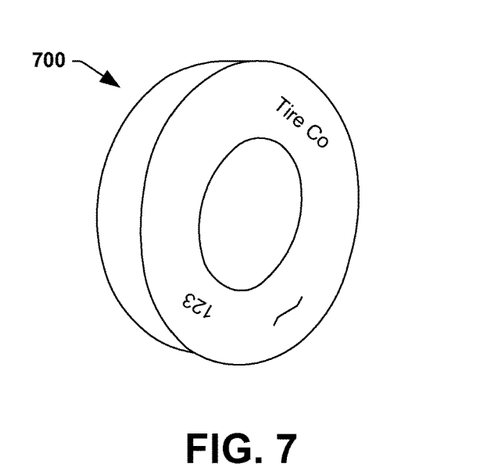
FIG. 7 illustrates an example radiation image representing a tire.
Figure 8:
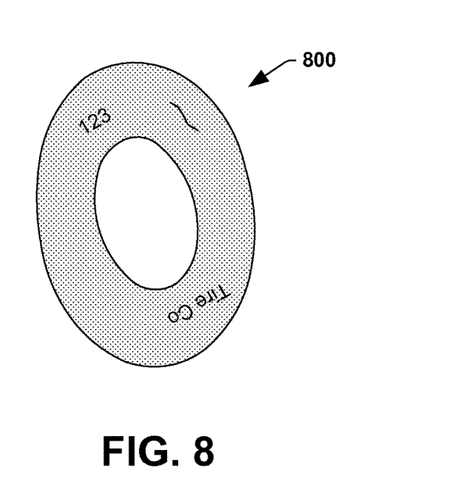
FIG. 8 illustrates an example vision image representing a tire.

Referring to FIGS. 7-11, example images that may be produced by the system 100 when scanning a tire comprising a defect are illustrated. Referring to FIGS. 7 and 8, images generated from the examination of the tire by the radiation imaging system and machine vision system are illustrated. More particular FIG. 7 illustrates a three-dimensional radiation image 700 depicting an interior volume of the tire, such as may be produced by the radiation imaging system, and FIG. 8 illustrates a two-dimensional vision image 800 depicting an exterior surface of the tire, such as may be produced by the machine vision system.

Figure 9:
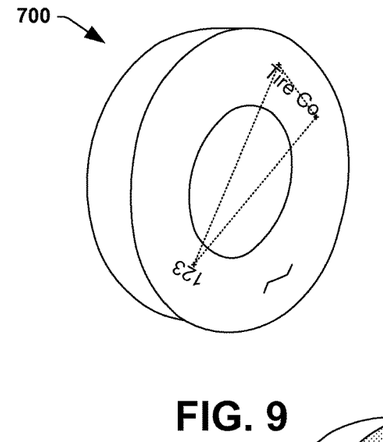
FIG. 9 illustrates an example radiation image representing a tire.

As described with respect to FIG. 5, in some embodiments, radiation images and/or vision images are configured to be processed to spatially correlate the images and/or to fuse the images. FIG. 9 illustrates the radiation image 700 after one or more geographical markers have been inserted into the radiation image 700 and FIG. 10 illustrates the vision image 800 after one or more geographical markers have been inserted into the vision image 800.

By way of example, the tire may comprise one or more markings that appear at the exterior surface of the tire and continue into an interior volume of the tire. For example, the company name, "Tire Co" and serial number of the tire, "123," may appear on both the radiation image 700 and the vision image 800. Accordingly, a first geographic marker component, which analyzes the vision image 800, may place geographical markers (e.g., represented by small X's) within the vision image 800 to identify the locations of such markings within the vision image 800. Further, the first geographic marker component may connect the markings by lines to form a shape describing the relative locations of such geographical markers.

A second geographic marker component, which analyzes the radiation image 700, may place geographical markers (e.g., represented by small X's) within the radiation image 700 to identify the locations of similar markings within the radiation image 700. Further, the second geographic marker component may connect the geographical markers inserted into the radiation image 700 to form a shape describing the relative locations of such geographical markers.

Figure 10:
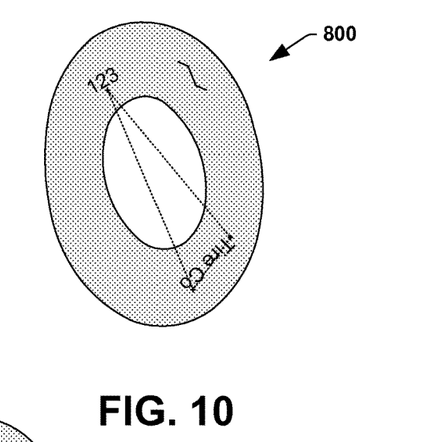
FIG. 10 illustrates an example vision image representing a tire.
Figure 11:
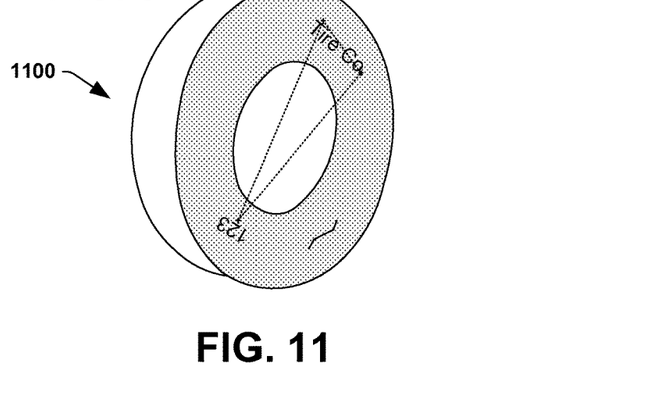
FIG. 11 illustrates an example fused image of a tire.

A correlation component may use the shape formed in the radiation image 700 with the shaped formed in the vision image 800 to correlate the radiation image 700 with the vision image 800 (e.g., aligning the triangle in FIG. 9 with the triangle in FIG. 10). Based upon this correlation, the radiation image 700 may be fused with the vision image 800 to generate a fused image 1100 as represented by FIG. 11.

Figure 12:
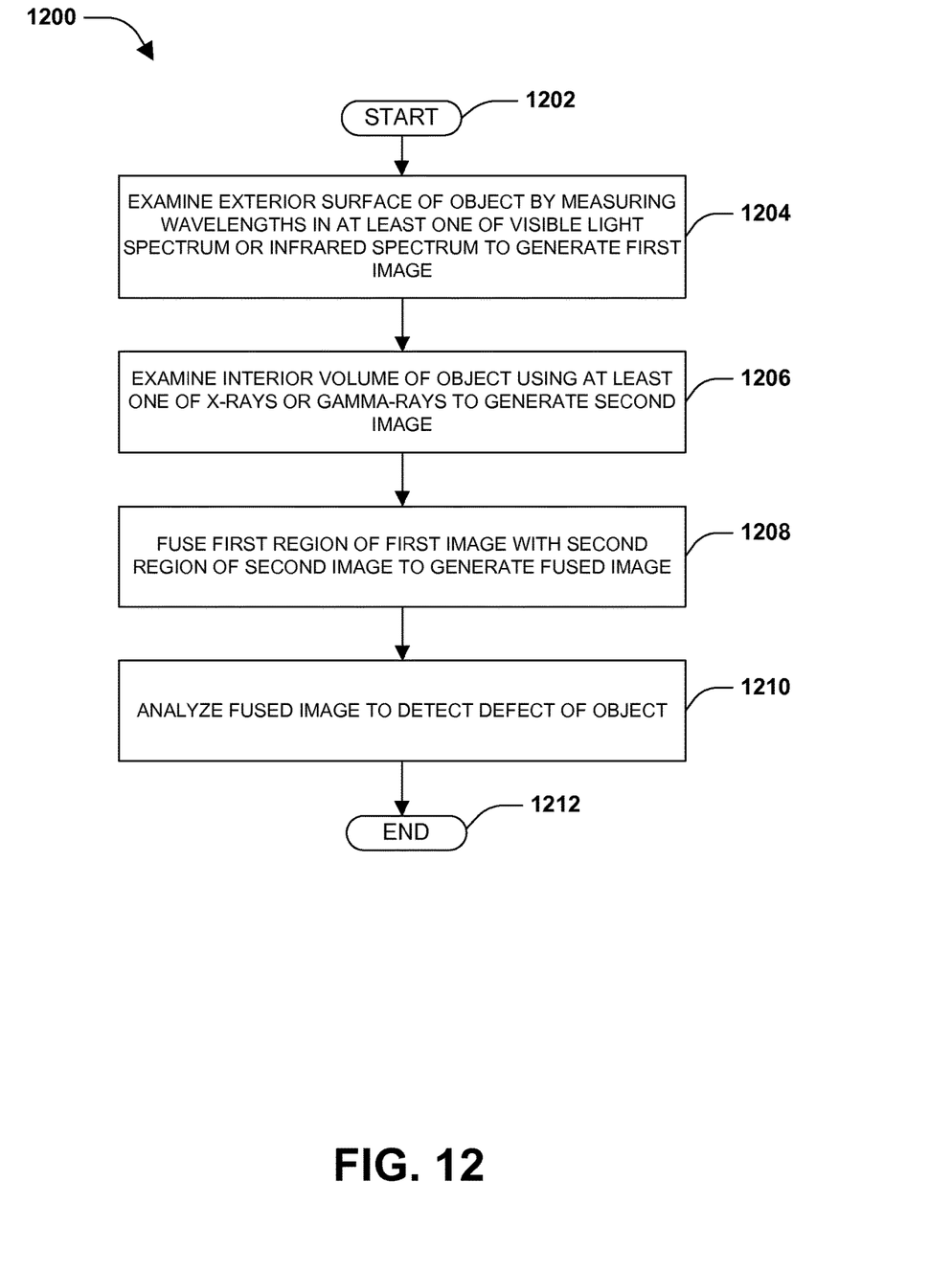
FIG. 12 is a flow diagram of an example method for object inspection.

Referring to FIG. 12, an example method 1200 according to some embodiments is illustrated. It is to be appreciated that the order of operations performed by the method is merely an example order and is not intended to limit the scope of the application, including the scope of the claims. By way of example, examining the exterior surface and examining the interior volume may occur concurrently. As still another example, the interior volume may be examined prior to examining the exterior surface.

The example method 1200 begins at 1202, and an exterior surface of the object is examined by measuring wavelengths in at least one of a visible light spectrum or an infrared spectrum at 1204. Based upon the measurements acquired at 1204, a first image (e.g., a vision image) may be generated which depicts an exterior aspect of the object (e.g., an exterior surface of the object). The first image may be two-dimensional or three-dimensional.

At 1206 in the example method 1200, an interior volume of the object is examined using at least one of x-rays and gamma-rays. By way of example, the object may be exposed to x-rays and/or gamma-rays and radiation photons traversing the object may be measured. Based upon measurements yielded from the detector array, a second image (e.g., a radiation image) depicting an interior aspect of the object may be generated. The second image may be a two-dimensional image or a three-dimensional image and may depict a slice through the object and/or an interior volume of the object.

At 1208 in the example method 1200, a first region of the first image is fused with a second region of the second image to generate a fused image depicting the first region and the second region. The first region may be all or part of the first image and the second region may be all or part of the second image. In this way, an image is generated that comprises aspects of the first image and aspects of the second image.

At 1210 in the example method, the fused image is analyzed to detect zero or more defects of the object. By way of example, CCL analysis and/or image segmentation may be performed to differentiate various portions of the object. Aspects of the image representing respective portions may then be analyzed to determine whether the portion comprises a defect (e.g., by comparing a segmented image to an image that should have been produced had there been no defect).

In some embodiments, upon a defect being identified, an alert is issued and/or the defect is verified. By way of example, if a defect is identified based upon the fused image, the fused image is displayed on a monitor and an entity confirms or rejects the identification. In some embodiments, based upon this feedback, one or more algorithms used for the analyzing is updated (e.g., using machine learning techniques).

The example method 1200 ends at 1212.

Figure 13:
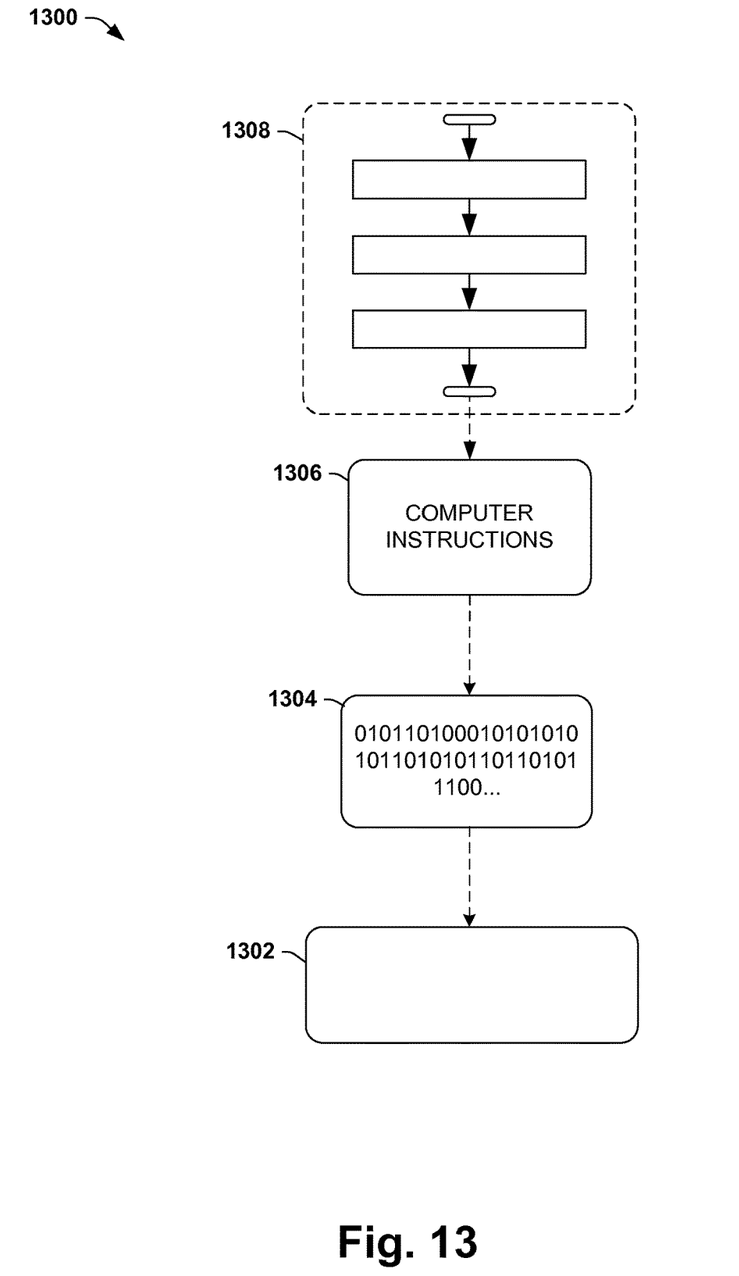
FIG. 13 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 13, wherein the implementation 1300 comprises a computer-readable medium 1302 (e.g., a CD-R, DVD-R, or a platter of a hard disk drive), on which is encoded computer-readable data 1304. This computer-readable data 1304 in turn comprises a set of processor-executable instructions 1306 configured to operate according to one or more of the principles set forth herein. In one such embodiment 1300, the processor-executable instructions 1306 may be configured to perform an operation 1308, such as the example method 1200 of FIG. 12, for example, when executed via a processing unit. In another such embodiment, the processor-executable instructions 1306 may be configured to implement a system, such as at least some of the example system 100 of FIG. 1, for example. Many such computer-readable media may be devised by those of ordinary skill in the art that are configured to operate in accordance with one or more of the techniques presented herein.

Although the subject matter has been described in language specific to structural features or methodological acts, it is to be understood that the subject matter of the appended claims is not necessarily limited to the specific features or acts described above. Rather, the specific features and acts described above are disclosed as embodiment forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". The claimed subject matter may be implemented as a method, apparatus, or article of manufacture (e.g., as software, firmware, hardware, or any combination thereof).

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B" or two different (or identical) channels or the same channel).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An inspection system, comprising:
a machine vision system configured to examine an exterior surface of a tire to generate a vision image of the exterior surface;
a radiation imaging system configured to examine an interior volume of the tire to generate a three-dimensional radiation image of the interior volume;
a correlation component configured to spatially correlate a first region of the vision image with a second region of the three-dimensional radiation image, wherein the correlation component is configured to spatially correlate the first region with the second region based upon a tread pattern of the tire; and
a feature identification component configured to perform an action with respect to the tire upon detecting a defect in the tire using at least one of the vision image or the three-dimensional radiation image.

2. The inspection system of claim 1, comprising a fusion component configured to fuse the first region with the second region to generate a fused image comprising the first region and the second region.

3. The inspection system of claim 2, comprising:
a feature selection component configured to process the fused image to scan for defects in the tire.

4. The inspection system of claim 1, wherein the action comprises issuing an alert notifying a user of the inspection system of the defect.

5. The inspection system of claim 1, wherein the radiation imaging system comprises a computed tomography system.

6. The inspection system of claim 1, comprising:
an object movement component configured to rotate the tire about a first axis concurrently with at least one of the machine vision system examining the exterior surface of the tire or the radiation imaging system examining the interior volume of the tire.

7. The inspection system of claim 6, wherein:
the radiation imaging system comprises a radiation source and a detector array, and
at least one of the radiation source or the detector array is configured to rotate about a second axis that is substantially perpendicular to the first axis.

8. The inspection system of claim 1, wherein the radiation imaging system comprises a line-scan system.

9. The inspection system of claim 1, wherein the vision image is a two-dimensional image depicting a non-planar exterior surface of the tire.

10. The inspection system of claim 9, comprising:
a machine vision image processor configured to dewarp the two-dimensional image.

11. The inspection system of claim 1, wherein the action comprises diverting the tire to a location designated for objects comprising specified defects.

12. The inspection system of claim 1, wherein the machine vision system comprises an image sensor configured to measure wavelengths in at least one of a visible light spectrum or an infrared spectrum.

13. A method for object inspection, comprising:
examining an exterior surface of an object to generate a first image depicting the exterior surface by measuring wavelengths in at least one of a visible light spectrum or an infrared spectrum;
examining an interior volume of the object to generate a second image depicting the interior volume using at least one of x-rays or gamma-rays, wherein:
the object is rotated about a first axis during at least one of the examining an exterior surface or the examining an interior volume, and
at least one of a radiation source configured to emit the at least one of x-rays or gamma-rays or a detector array configured to detect the at least one of x-rays or gamma-rays is rotated about a second axis that is substantially perpendicular to the first axis during the examining an exterior surface and the examining an interior volume;
fusing a first region of the first image with a second region of the second image to generate a fused image;
analyzing the fused image to detect a defect of the object; and
performing an action with respect to the object upon detecting the defect.

14. The method of claim 13, comprising:
verifying the defect; and
updating one or more algorithms used for the analyzing responsive to the verifying.

15. The method of claim 13, wherein the examining an exterior surface and the examining an interior volume are performed concurrently.

16. The method of claim 13, wherein the performing an action comprises issuing an alert notifying a user of the defect.

17. The method of claim 13, comprising dewarping the first image.

18. An inspection system, comprising:
a machine vision system configured to examine an exterior surface of an object to generate a vision image of the exterior surface;
a radiation imaging system configured to examine an interior volume of the object to generate a radiation image of the interior volume, wherein the radiation imaging system comprises a radiation source and a detector array configured to rotate about a first axis;
an object movement component configured to rotate the object about a second axis concurrently with at least one of the machine vision system examining the exterior surface or the radiation imaging system examining the interior volume, wherein the second axis is substantially perpendicular to the first axis; and
a correlation component configured to spatially correlate a first region of the vision image with a second region of the radiation image.

19. The method of claim 13, wherein the performing an action comprises diverting the object to a location designated for objects comprising specified defects.

20. The method of claim 13, wherein the fusing comprises spatially correlating the first region with the second region based upon one or more features detectable in both the first image and the second image.

* * * * *